April 22, 1958     D. M. MONTGUIRE     2,831,442
TRANSPLANTER MACHINE Filed Sept. 29, 1954     4 Sheets-Sheet 1

INVENTOR.
DAVID MURRAY MONTGUIRE
BY
*Andrus & Sceales*
ATTORNEYS

April 22, 1958   D. M. MONTGUIRE   2,831,442
TRANSPLANTER MACHINE

Filed Sept. 29, 1954   4 Sheets-Sheet 2

INVENTOR.
DAVID MURRAY MONTGUIRE
BY Andrus & Sceales
ATTORNEYS

April 22, 1958 D. M. MONTGUIRE 2,831,442
TRANSPLANTER MACHINE
Filed Sept. 29, 1954 4 Sheets-Sheet 3

INVENTOR.
DAVID MURRAY MONTGUIRE
BY
*Andrus & Scales*
ATTORNEYS

April 22, 1958 D. M. MONTGUIRE 2,831,442
TRANSPLANTER MACHINE
Filed Sept. 29, 1954 4 Sheets-Sheet 4

INVENTOR.
DAVID MURRAY MONTGUIRE
BY
Andrus & Sceales
ATTORNEYS 2,831,442
TRANSPLANTER MACHINE
David Murray Montguire, Milwaukee, Wis.
Application September 29, 1954, Serial No. 459,175
15 Claims. (Cl. 111—3)

This invention relates to a transplanter machine and has particular reference to a machine for planting rooted shoots of young plants such as tobacco, cabbages, head lettuce, strawberries, tomatoes, broccoli, pepper plants, nursery stock and the like.

In general, the invention is directed to a machine which can be drawn through a field by a tractor or other power means to accomplish the planting operations. The machine comprises a frame which is supported at the rear by a pair of rubber tired wheels and at the forward end carries a pair of transversely spaced coulters and plows for breaking up the ground and providing furrows into which the shoots to be planted are deposited by the machine. The furrows are closed around the plants by packing wheels located about midway of the length of the machine.

The rotation of the wheels of the machine through gears and a preselector mechanism and other power transmission means drives a pair of endless conveyors on each side of the machine over the frame and down adjacent the ground. One conveyor carries a plurality of freely hinged spring pressed fingers with flanges projecting therefrom for grasping a plant. The fingers ride flat over the top of the frame where they are opened by cam means for being loaded with a plant and then close about the plant as they descend toward the ground. The second conveyor is provided to operate in synchronism with the finger conveyor so that the plants will be carried along properly when they are initially loaded into the fingers. On the descent of the fingers they are guided to a vertical position. The construction for effecting movement of the fingers from horizontal to vertical and vice versa is believed to be novel. The preselector mechanism automatically determines the spacing between plants and effects intermittent drive of the conveyors to obtain the plant spacing desired. The mechanism provides a versatility in planting operations that prior machines do not have.

One of the problems with a transplanter machine is the placing of a plant in the ground and release thereof by the conveyor finger without stripping the plant or sweeping across plants that have already been deposited and planted. The present invention overcomes this problem by a double cam means which opens each finger to deposit the plant and then swings the finger from the deposited plant. The novel hinged support of the fingers permits ready movement of the fingers from a horizontal to a vertical position and operation thereof by the cam means to clear each finger from the plants.

The machine of the invention is also an improvement in previous machines in the plow construction which provides a broad furrow and a turbulent soil around the plants which is then packed down by the packing wheels on either side of the plant in a manner to substantially exclude air from the soil.

The shape of the plow and the adjustment for the packing wheels is believed to accomplish firm and level planting of plants that other machines have not obtained.

The machine is also extremely versatile in use in that it can plant two rows simultaneously which are from about eighteen inches to about six feet apart with the plants spaced in each row from about three inches to about seventy-two inches in multiples of three. These planting operations can be accomplished at speeds from two to five miles an hour.

Other objects and advantages of the invention will appear hereinafter in connection with the following description of the drawings illustrating an embodiment of the invention.

Referring to the drawings, there is illustrated a transplanter machine comprising a generally lightweight open frame 1 provided by front, rear and side sills which are spaced from corresponding lower sills by four vertical corner posts 2 and four intermediate posts 3. A longitudinal brace 4 extends between intermediate posts 3 on either side of the lower part of the machine and corresponding braces 5 extend at the upper part of the machine between the intermediate posts 3. The outer members of frame 1, longitudinal braces 4 and 5 and posts 2 and 3 define separate compartments 6 and 7 on either side of the machine in which separate corresponding planting mechanism is supported and operated. The frame 1 is telescopically constructed at the front and rear so that the frame may be extended to widen the machine for planting rows of plants farther apart.

The frame portion of the machine is completed by vertical H-shaped frame members 8 which are located about midway and transversely of each compartment 6 and 7. The inner leg of each H-member 8 is secured at the lower and upper ends to longitudinal braces 4 and 5 respectively. The upper end of the outer leg of each H-member 8 is secured to a horizontally extending inner-frame 9 which is secured to the side sill of frame 1 and the upper longitudinal brace 5. The lower end of the outer leg of each H-member 8 is secured to a short brace 10 that extends to the forward end of the machine parallel to longitudinal brace 4 and outwardly thereof. Brace 10 is supported on the lower side and forward sills of frame 1.

The machine is supported at the rear by transversely spaced rubber-tired wheels 11 and is drawn and driven by power means, not shown, attached to the machine by means of hitch 12 which is pivoted to the lower and upper sills of frame 1 at the forward end of the machine.

Since each side of the machine is constructed the same the description hereafter directed to the mechanism in compartment 6 is also applicable to the mechanism in compartment 7 as well as to the operation of such mechanism.

The wheel 11 of compartment 6 is supported on a short shaft 13 which extends transversely from an L-shaped tubular housing 14. The forward end of housing 14 from which shaft 13 extends is pivotally connected to a jack housing 15 which has a rod 16 threaded therein, in turn supported from the horizontal inner-frame 9. Rotation of rod 16 effects raising and lowering of wheel 11. The base of housing 14 is secured at the outer end to the vertical wheel axial brace 17 that extends between the upper and lower sills of frame 1 at the rear of the machine. The inner end of the base of housing 14 is supported on the housing of a preselector mechanism 18 which is secured to the frame by means of rear intermediate post 3 and an additional post provided forwardly of post 3 between braces 4 and 5.

The wheel 11 is rotated when the transplanter is moved forwardly and in turn rotates a sprocket 19 located on the hub of the wheel and from which extends an endless chain 20 that engages a sprocket 21 located on the end of a shaft 22 which projects outwardly from the base of housing 14 and extends therethrough and into the housing of preselector mechanism 18. Thus shaft 22 is driven by the ground wheel 11 and thereby synchronized therewith. The preselector mechanism 18 will be described in detail later hereinafter as it functions not only to transmit power from the wheels for operation of the machine parts but operation of the preselector mechanism also determines the longitudinal spacing between the shoots which are to be planted by the machine.

In order to accomplish the planting operation, compartment 6 has two forwardly moving synchronized endless conveyors 23 and 24.

The preselector mechanism 18 effects driving of the conveyors through a sprocket 25 located on a shaft extending outwardly from preselector 18 and a chain 26 which engages a sprocket 27 in turn integrally secured to a transverse shaft 28 that is rotatably supported in bearing brackets 29 substantially above wheels 11. Brackets 29 are axially aligned, with one bracket being secured to the side sill of frame 1 and the other bracket 29 being secured to longitudinal brace 5.

Sprocket 27 drives shaft 28, and shaft 28 in turn rotates a sprocket 30 which meshes with conveyor 23 and a second sprocket 31 which meshes with conveyor 24 outwardly spaced from the conveyor 23. The conveyors 23 and 24 are thus driven in synchronism.

The support for conveyors 23 and 24 at the forward end of the machine comprises a transverse shaft 32 supported from the side sill of frame 1 and longitudinal brace 5, respectively, by bearing brackets 33 and a pair of sprockets 34 on the shaft that mesh, respectively, with conveyors 23 and 24. One bearing bracket 33 is supported on the side sill of frame 1, the other on longitudinal brace 5.

Conveyor 24 never descends to the ground and is supported at only the front and rear of the machine as described. The function of this conveyor is to provide a plurality of moving flat plates 35 suitably secured thereto and synchronized in their forward movement with the movement of conveyor 23 so that the plants that are loaded onto conveyor 23, as will be described, will remain transversely of the machine as they are moved toward the forward end of the machine.

Referring now to the planting conveyor 23, when the latter conveyor passes over sprocket 34 it proceeds downwardly somewhat diagonally toward the ground due to its passage over the semi-circular end of a shoe 36 and thence upwardly to the rear of the machine and again over drive sprocket 28.

The shoe 36 is somewhat triangular in shape with a semi-circular track thereon for conveyor 23 and is secured at its upper end portion to a bracket 37 that is welded to vertical H-member 8 and short brace 10. An elongated cam 38 is provided on the face of shoe 36 toward the rear of the machine. The use of cam 38 will be later described. Between the shoe 36 and bracket 37 is located a triangular shaped cam plate 39 which is secured to bracket 37 by the same means as shoe 36. The bottom end of cam plate 39 carries a cam 40 toward the forward side of the machine. The use of this cam will also later be described.

To provide conveyor 23 with planting means, the fingers 41 are secured to the conveyor intermittently at regular spaced intervals therealong.

Fingers 41 are formed of two parts which are generally centrally pivoted together. The larger part 42 overlies the smaller part 43. The ears 44 extend from the upper portion of part 42 and are pivoted by pin 45 to a bearing 46 which is secured to conveyor 23. The manner of pivoting part 42 to the conveyor allows the finger to freely pivot on the conveyor in moving from a horizontal to vertical position or vice versa. A projection 47 extends upwardly from part 42 and is slightly twisted to provide the projection as a cam follower as will be described.

The lower end of finger part 42 carries a flat bar 48 that overlies part 43 at right angles thereto for supporting a plant laid into the finger 41. Both of the finger parts carry the upstanding flange 49 at the lower end so that they can readily grasp a plant. The flanges 49 may be rubber coated to protect the plant. The smaller finger part 43 at the upper end carries the diagonal extension 50 and is normally held in a closed position with respect to finger part 42 by a coil spring 51 that extends between the finger parts at the pivotal area. Extension 50 is slightly twisted and operates as a cam follower as will be described.

The operation of the fingers is governed by guides and cam members. At the top of the machine the cam bar 52 is secured and extends along a good share of the length of the machine. As the fingers move upwardly from the ground to the top of the machine they are closed by spring 51. When they pass to the top of the machine the extension 50 of each finger part 43 engages the cam track of bar 52 and the fingers are opened. When extension 50 rides off from the bar 52 at the forward end of the machine the spring 51 automatically closes the fingers. In the construction of bar 52 it is important that the cam track at the rear be tapered to open the fingers abruptly so that they are immediately opened for loading. Correspondingly at the forward end of the machine the cam track of bar 52 has a gradual taper so that the fingers will gently close about a plant.

The fingers 41 lie flat in their passage over the top of the machine with the flanges 49 upright. When the fingers reach the forward end of the machine, due to their pivotal connection to the conveyor, as the fingers descend they are gradually guided to a vertical position at which position the flanges 49 are at right angles to the direction of movement of the machine. The swing to vertical position is guided on the descent by the curved track 53 suitably secured to the upper longitudinal member 5 of the machine. The projection 47 of each finger part 42 rides in track 53 and prevents the fingers from suddenly swinging to vertical position. The fingers are also guided on their descent by the curved rod 54. A curved rod 55 at the rear of the machine returns the fingers gradually to the horizontal position they obtain in passing upwardly and over the top of the machine.

When the fingers reach cam plate 39 at the bottom of the machine the extension 50 of each finger rides over cam 40 which opens the fingers and deposits the plants 56 in the ground. Simultaneously with release of a plant 56, projection 47 of the larger part 42 of each finger engages cam 38 and is swung transversely outwardly of the machine to remove flanges 49 from the plant at substantially right angles to the direction of movement of the machine. By this action each finger clears the plant it has deposited and does not strip the deposited plant or engage the plants previously planted.

In order to establish a furrow in which plants 56 may be deposited, the forward end of the machine is provided with a pair of plows 57 and coulters 58. Only one plow and coulter need be described.

The coulter 58 is a semi-circular shaped heavy plate that breaks up the ground ahead of the plow and is suitably secured to the forward end of the plow to engage the ground in an edgewise manner.

Plow 57 has a generally hollow U-shape throughout the greater part to provide the furrow desired and to permit the fingers 41 in their descent to pass downwardly through the body of the plow. The plow extends from the forward end of the machine to a line slightly ahead of where the plants are deposited which is about midway of the machine. The upper end of the outer side of the plow is bolted to short brace 10 and the upper end of the inner side of the plow is bolted to longitudinal brace 4. Vertical holes are provided along the upper end portion of the plow so that the plow can be bolted in place at at least three different heights.

The upper and rearward side surface 59 of plow 57 is generally straight while the forward lower side surface 60 is tapered on each side to provide a relatively sharp edge that enters the ground and initially cuts the ground behind coulter 58. The rear edge 61 of the plow extends perpendicularly from the bottom of the plow and then curves rearwardly as at 62. The effect of the rear edge construction is to turbulate the soil around the plant that is deposited to spread the roots of the plant. The wide extent of the plow at the rear forms the furrow desired.

A pair of packing wheels 63 are supported just to the rear of plow 57 at an angle of about twenty degrees. One wheel is secured to an extension bolted to the inner leg of vertical H-member 8 while the other wheel is secured to an extension bolted to the outer leg of vertical H-member 8. The wheels 63 can also be adjusted to at least three vertical positions by vertical movement of the extensions to which they are secured. The packing wheels after turbulating of the soil by the plow and deposit of the plant in the furrow immediately pack the soil firmly around the plant, excluding any excess air. The plow and packing wheels are designed and adjustable relative to each other for use in both moist and dry soil so that the soil between the wheels and plow is a predetermined amount whereby the plants are always located on the same level. Level planting is particularly required where accurate depth planting is needed, as in the case of plants like strawberries. The compression of the packing wheels 63 is also controlled by adjustment of the height of drive wheels 11 relative to the frame of the machine by operation of the threaded rod 16 in jack housing 15. When the frame is lowered relative to the wheels the packing wheels 63 will pack the soil tighter.

The conveyor 23 is driven to accomplish the movement of the fingers 41 and deposit of plants 56. The movement of the machine over a field is usually at a speed of from 2 to 5 miles per hour. This movement is translated to movement of the conveyor 23 from wheels 11 by the transmission previously referred to as preselector mechanism 18.

As described heretofore, shaft 22 extends through the base of housing 14 to the inside of the housing of preselector mechanism 18 where it is secured to a small gear 64 which meshes with and drives the large gear 65. The large gear near its circumference carries a plurality of freely movable transverse tappets or pins 66. The number of pins shown for purposes of illustration is twenty-eight. The space between each pin represents a distance of three inches. With the construction shown in the drawings, the selection of the proper pins translates the speed of rotation of drive wheels 11 to a deposit of plants through movement of the conveyor at from three to seventy-two inches apart.

The pins 66 are moved to operative position by an indexing means in the form of upright selector 67 as will be described. When a pin is moved through the gear 65 by selector 67, as gear 65 rotates the pin engages the star wheel 68. The star wheel 68 is supported on a short shaft 69 that extends through preselector housing 18 and projects outwardly therefrom to support the sprocket 25 from which extends the chain 26 to sprocket 27 on shaft 28 to drive conveyors 23 and 24.

The middle-sized gear 70 is located within preselector housing 18 on shaft 69 opposite star wheel 68 and is revolved when star wheel 68 is actuated by one of the pins 66.

A pair of posts 71 extend over shaft 69 and on these posts is suitably supported a spur gear 72 which is disposed between gear 70 and a selector gear 73 located forwardly of gear 70. The spur gear 72 may be shifted transversely on posts 71 to engage and disengage the spur gear from selector gear 73.

The selector gear 73 carries a bevel gear 74 on the face of the gear to the outside of the machine in which is meshed the pinion 75 of the upright selector 67 which comprises a vertical shaft at the upper end of which is secured an indexing wheel which is rotated by the shaft of selector 67 upon movement of bevel gear 74 when gear 73 is revolved, to strike a selected pin 66 and force it through large gear 65 for driving engagement with the star wheel 68. In addition, a horizontal brace 76 secured selector 67 to a circular plate 77 which is supported by a short shaft for rotation on the inner wall of selector housing 18. Plate 77 is located to the inside of the machine from gear 73 and has circumferentially spaced holes 78 therein. The use of holes 78 will be described hereinafter.

The pins 66 are forced back to initial position by a cam 79 which is secured to the housing of preselector 18 below the star wheel 68 and over which the pins are driven by rotation of large gear 65.

Figure 1:
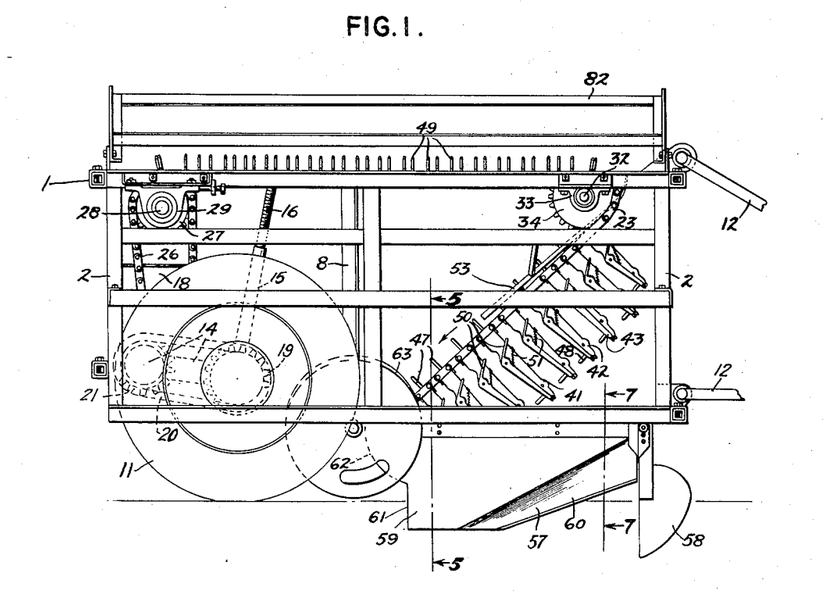
Figure 1 is a side elevational view looking at one side of the machine.
Figure 2:
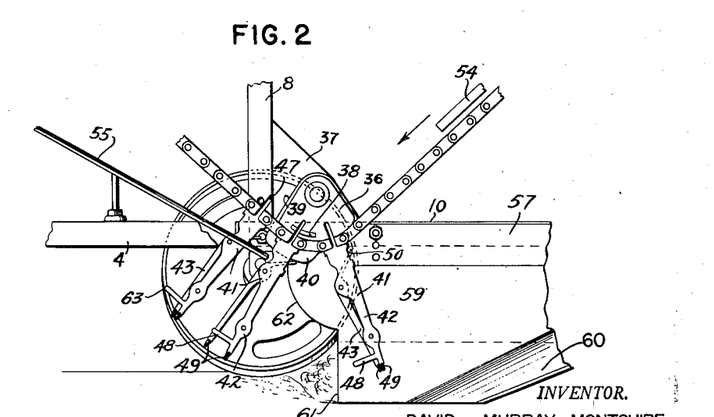
Fig. 2 is a detail side elevational view of the conveyor and cam at the lower center portion of the machine.
Figure 3:
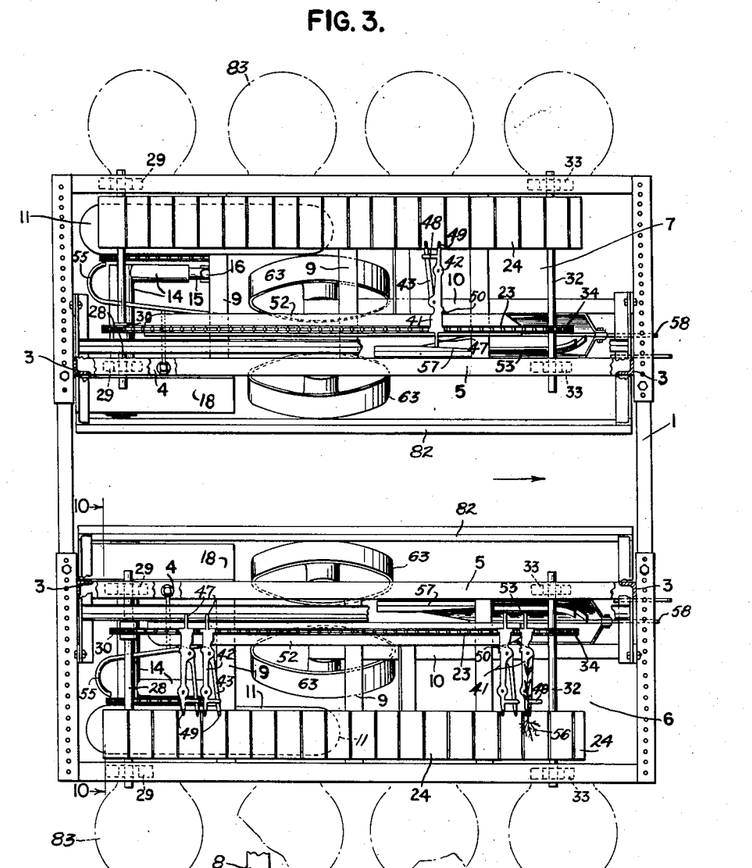
Fig. 3 is a top plan view of the machine.
Figure 4:
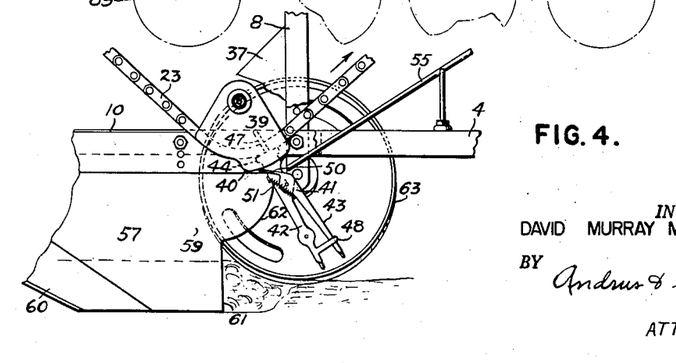
Fig. 4 is a view similar to Fig. 2 but taken from the outside with one of the packing rollers removed.
Figures 5, 6, 7:
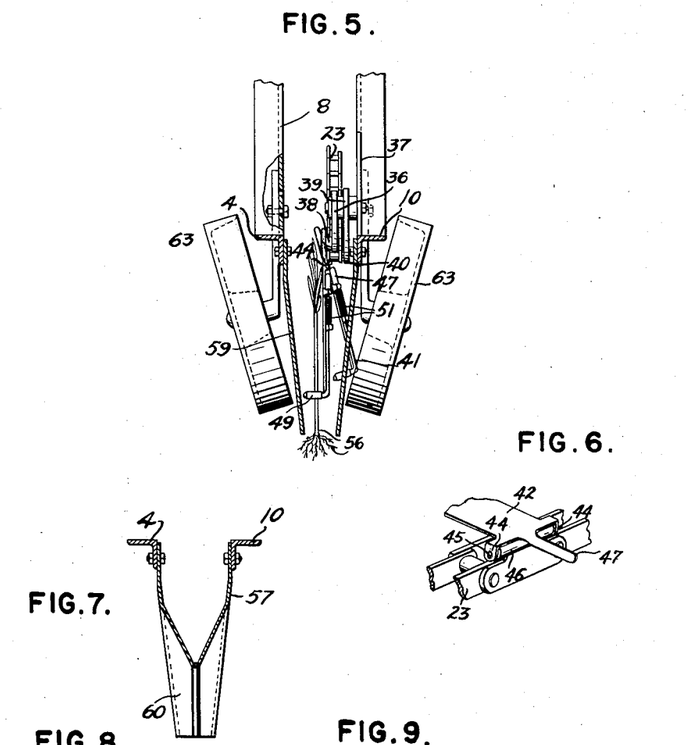
Fig. 5 is a section taken on line 5—5 of Figure 1 before the finger reaches a vertical position.
Fig. 6 is a detail perspective of the finger attachment to the conveyor.
Fig. 7 is a section taken on line 7—7 of Figure 1.
Figure 8:
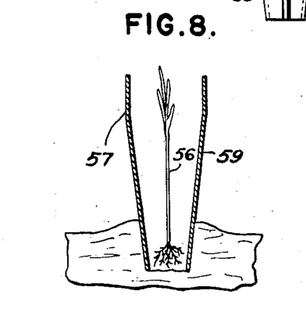
Fig. 8 is a detail sectional view with the furrow cut and the plant in vertical position.
Figure 9:
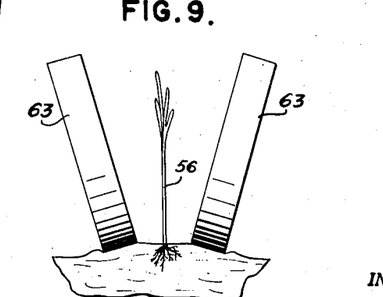
Fig. 9 is a view similar to Fig. 8 with the plant in place and showing the condition of the ground at that time and the packing rolls packing the ground around the plant.
Figure 10:
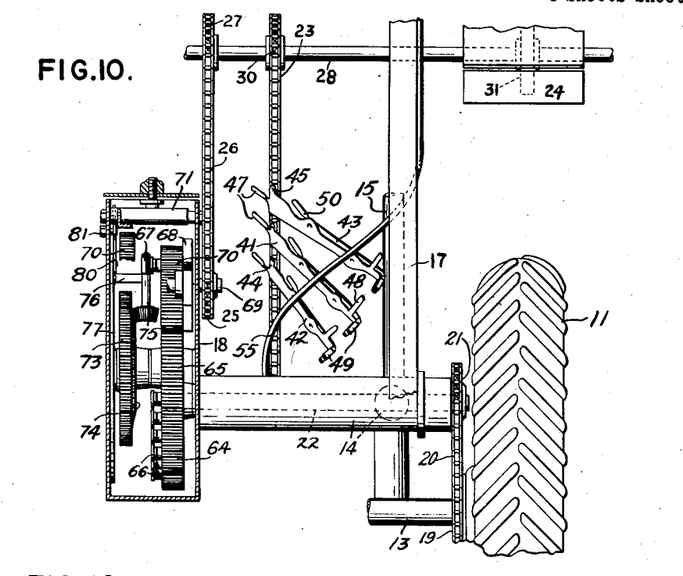
Fig. 10 is a section taken on line 10—10 of Figure 3 showing the rear of machine and the selector with the rear of the selector housing removed and parts in elevation.
Figure 11:
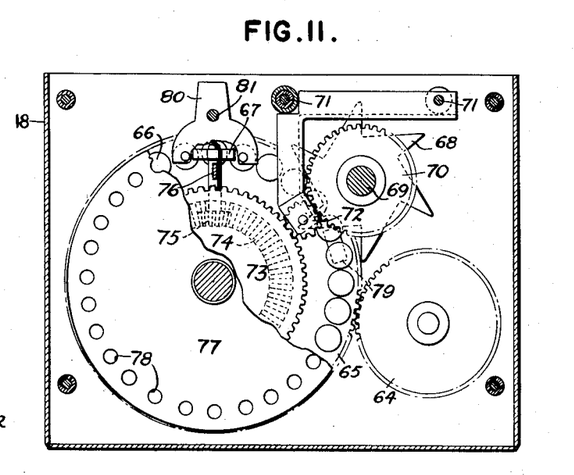
Fig. 11 is a side view of the selector taken from the inner side of the machine with the side of the gear box removed and with parts broken away.
Figure 12:
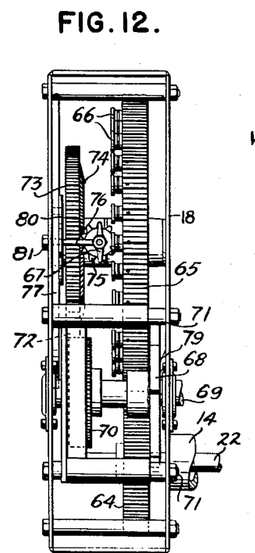
Fig. 12 is a top plan view of the selector with the cover removed.

In starting the operation of the selector 67 spur gear 72 is disengaged from gear 73 and a pin 66 is initially pushed through gear 65 manually. Selector 67 and gear 73 are then moved manually by grasping selector 67 until, for example, if the operator wishes to deposit a plant every nine inches, the indexing wheel of selector 67 is three pins to the left from the pin initially pushed in as shown in Fig. 11 of the drawing. After this setting is made the clevis 80 is inserted inside the housing of preselector 18 with dowels therein disposed in two spaced holes 78 in plate 77. Bolt 81 is then inserted through the selector housing and the body of clevis 80 to secure the clevis against plate 77 and hold it against movement. Selector 67 will then be rotated through pinion 75 and the shaft of the selector by gear 74 as gear 73 revolves, to automatically depress every third pin 66 removed from the pin previously depressed to drive star wheel 68 by the depressed pins. Although the distance between each pin represents three inches, and the selector mechanism moves three inches at a time, the setting described results in deposit of the plants at every nine inches due to the distance between the outer end portions of the fingers 41 as they reach the position where the finger 41 carrying a plant 56 is within the inner end of plow 57 and the finger which has just deposited a plant is inside the packing wheel 63.

If it is desired to plant the plants three or six inches apart it is necessary to enlarge the circle through which conveyor 23 passes by using a larger shoe 36 and increasing the teeth on gear 25 as distinguished from the gear 25 and shoe 36 shown in the drawings. If three inches are desired the largest shoe 36 is used and the teeth required on gear 25 are thirty-six. Where six inch plantings are desired a slightly smaller shoe than the shoe 36 for three inch plantings is used and eighteen teeth are employed on gear 25.

As the large gear 65 rotates, when the depressed pins 66 pass from the star wheel 68 they engage cam 79 and are forced back to their initial position.

The racks 82 can be pivotally secured to the inner side of each compartment 6 and 7 to support the plants which are to be planted by the planters and seats 83 can be provided on each side of the machine to support the planters as the machine is pulled through a field. The machine is also provided with braking and clutching means which have not been described since they form no part of the invention but which are necessary to have full control of the machine.

The operation of the machine is as follows:

Assume that the rows of plants are to be planted twenty-four inches apart and each plant in each row is to be nine inches apart, the frame of the machine is first telescoped, to locate the furrows to be provided by plows 57, the desired distance of twenty-four inches. Next, a pin 66 is depressed and the spur gear 72 is disengaged from selector gear 73 and selector 67 is then shifted until the indexing wheel of selector 67 is stationed at the pin 66 three pins to the left of the depressed pin as shown in Fig. 11. Plate 76 is then bolted to the housing of preselector 18 by bolt 80. Spur gear 72 is then reengaged with selector gear 73 to effect rotation of gear 73 through gear 74 and pinion 75 and rotation of selector wheel 67 to engage and depress each fourth pin 66. As the machine moves forwardly wheels 11 drive shaft 22 and small gear 64 which results in movement of the preselector parts 18 as described and driving of spur gear 72 by pins 66 to rotate gear 25 and conveyors 23 and 24. The described setting of the pins effects a three-inch movement of the selector mechanism but deposit of plants is made every nine inches due to the spacing of the fingers through the arc which the outer portions of the fingers inscribe.

As the fingers 41 come up to the top of the machine they lie flat and are abruptly opened by engagement of extension 50 with cam bar 52. The planting operator then lays a plant into the finger between flanges 49 and over finger bar 48 with the root of the plant toward the operator. Each finger is thus loaded with a plant.

When the fingers 41 reach the forward end of bar 52 they gradually close under the force of coil spring 51 as extension 50 rides off from bar 52 and the plant is gently grasped by flanges 49 above the heart of the plant.

As the fingers move downwardly they are gradually guided to a vertical position with flanges 49 at right angles to the furrow and direction of movement of the machine. When shoe 36 is reached extension or cam follower 50 engages cam 40 on plate 39 and opens each finger to vertically deposit the plant with the roots down. Simultaneously, projection or cam follower 47 engages cam 38 and swings the finger from the plant at generally right angles to the furrow. The fingers 41 then move upwardly to horizontal position at the top of the machine.

Prior to deposition of the plants by the fingers 41 coulter 58 has broken the ground and a furrow has been cut by plow 57. As each plant is deposited the plow turbulates the soil to spread out the roots of the plant in the furrow and almost simultaneously the packing wheels 63 compress the soil about the roots to firmly pack the plant in place and extrude the air from the soil.

The invention provides a transplanter by which two rows of plants can be planted simultaneously with the widths of rows varying from about eighteen inches to about six feet and the spacing of plants in each row varying from about three inches to seventy-two inches. The planting can be done with the transplanter moving at from two to five miles per hour. The preselector mechanism adds considerable versatility to the invention.

The invention also provides for novel movement of the planting fingers from a horizontal loading position to a vertical planting position whereby the fingers are readily opened for depositing the plants and easily removed from each plant by means that prevents stripping of the plant or engagement with plants previously deposited.

The plow construction for forming and turbulating the furrow cooperates with the packing wheels to locate the plants at the same level and are features that make the machine and its operation correspond to planting by hand.

Various modes of carrying out the invention are contemplated as within the scope of the following claims particularly pointing out and distinctly claiming the subject matter which is regarded as the invention.

I claim:

1. In a transplanter machine, an endless conveyor having pivoted thereto a series of plant planting members, means to drive said conveyor, grasping means on said members, means to open said members for receiving a plant within the grasping means, means to close said grasping means about said plants, said planting members lying in a horizontal plane while moving over the top of the machine with the grasping means projecting therefrom, and said planting members pivoting to a vertical position when moved toward the ground by the conveyor to move said plants from a horizontal to a vertical position as they are grasped by said grasping means as the conveyor descends toward the ground, cam means secured to said machine adjacent the ground to open the fingers to deposit the plants in the ground, and a second cam means secured to the machine to the rear of the first cam means to pivot said fingers from the plants in a path substantially transversely to the direction of movement of the machine as the fingers move with the conveyor upwardly into the machine to thereby prevent stripping of the plants and engagement with plants previously planted.

2. A transplanter machine, which comprises a two compartment frame supported on wheels and adapted to be moved forwardly and rearwardly by driving means, an endless conveyor disposed in each compartment of the frame and adapted to be moved forwardly of the machine over the frame and down to and up from the ground, a series of fingers pivoted to each conveyor and disposed to lie flat in a plane at substantially right angles to the movement of the machine when moving over the upper part of the frame and to pivot to vertical position when moved down to the ground, each of said fingers being adapted to receive a plant to be deposited in the ground, tension means on said fingers normally holding the fingers in a closed position, cam means secured to the frame adjacent the upper part of the frame to open the fingers for loading with a plant with the tension means effecting closing of the fingers about a plant when the fingers ride off said cam to convey the plant to the ground, additional cam means secured to said frame adjacent the ground to open each finger and effect deposit in the ground of a plant held thereby and to move each finger from the deposited plants without stripping the same or engaging previously deposited plants, and means to drive said conveyors simultaneously.

3. A transplanter machine, which comprises a two compartment frame supported on wheels and adapted to be moved forwardly and rearwardly by driving means, an endless conveyor disposed in each compartment of the frame and adapted to be moved forwardly of the machine over the frame and down to and up from the ground, a series of fingers pivoted to each conveyor and disposed to lie flat in a plane at substantially right angles to the movement of the machine when moving over the upper part of the frame and to pivot to vertical position when moved down to the ground, flange means projecting from each of said fingers to receive a plant to be deposited in the ground, tension means on said fingers normally holding the fingers in a closed position, cam means secured to the frame adjacent the upper part of the frame to open the fingers for loading with a plant with the tension means effecting closing of the fingers about a plant when the fingers ride off said cam to convey the plant to the ground, additional cam means secured to said frame adjacent the ground to open each finger and effect deposit in the ground of a plant held thereby and to move each finger from the deposited plants without stripping the same or engaging previously deposited plants, means to adjust the compartments relative to each other to regulate the distance between rows of plants, means to drive said conveyors simultaneously, and preselector means connected to the drive means to automatically drive the conveyors predetermined increments to effect deposit of plants the distance apart selected by the operator in setting the preselector means.

4. A transplanter machine, which comprises an open frame supported on wheels and having means at the forward end for attachment to a power vehicle for driving the transplanter, an endless conveyor supported in the frame above said wheels and disposed to move over the frame forwardly of the machine and thence down to and up from the ground, a drive shaft connected to at least one of said wheels and rotated thereby, transmission means connecting the drive shaft and endless conveyor to rotate the conveyor in the direction of movement of the machine, a series of fingers pivoted to said conveyor and having flanges at substantially right angles thereto for receiving the plants to be deposited in the ground, cam means on the upper portion of the machine to open said fingers to receive plants between said flanges, means to close the flanges of the fingers about said plants as the fingers move from the cam means at the top of the machine, the pivoting of the fingers to the conveyor permitting the fingers to swing to a vertical position as the conveyor descends to the ground with the flanges of the fingers substantially transverse to the direction of movement of the machine, means at the forward end of the machine to break the ground and provide a furrow in line with the descending conveyor, cam means at the lower portion of the frame to open the fingers to deposit the held plants in the furrow, and means adjacent said last named cam means to swing each finger after deposit of a plant away from the plant in a plane substantially transverse to the direction of movement of the machine.

5. A transplanter machine, which comprises a frame supported on wheels and having means at the forward end for attachment to a power vehicle for driving the transplanter, an endless conveyor supported in the frame above said wheels and disposed to move over the frame and thence down to and up from the ground, a drive shaft connected to at least one of said wheels and rotated thereby, transmission means connecting the drive shaft and endless conveyor to rotate the conveyor in the direction of movement of the machine, a series of fingers pivoted to said conveyor and having flanges at substantially right angles thereto for receiving the plants to be deposited in the ground, means on the upper portion of the machine to open said fingers to receive plants between said flanges, means to close the flanges of the fingers about said plants as the fingers move from the top of the machine, the pivoting of the fingers to the conveyor permitting the fingers to swing to a vertical position as the conveyor descends to the ground with the flanges of the fingers substantially transverse to the direction of movement of the machine, means at the forward end of the machine to break the ground and provide a furrow in line with the descending conveyor, cam means to open the fingers to deposit the held plants in the furrow, means to swing each finger after deposit of a plant away from the plant in a plane substantially transverse to the direction of movement of the machine, a preselector mechanism provided as part of said transmisison, and indexing means in said preselector mechanism actuated by the operator to establish the movement of the selector mechanism a predetermined distance that will effect movement of the conveyor the distance the operator determines the plants should be spaced apart.

6. In a transplanter machine, an endless conveyor disposed to move in a path horizontally over the top of the machine thence downwardly to the ground and upwardly back to the top of the machine, means to drive said conveyor at a selected speed, a series of fingers pivoted to the conveyor, a flange provided on each finger at generally right angles to the finger, spring means normally holding said fingers closed, a longitudinally extending cam bar secured to the top of the machine and engageable by said fingers to open the fingers to receive a plant between said flanges and to effect closing of the fingers about said plants by the spring means as the fingers ride off the top of the machine, said fingers lying in a horizontal plane while moving over the top of the machine with the flanges projecting vertically upwardly therefrom and said fingers pivoting to a vertical position when moved toward the ground by the conveyor to move the plants from a horizontal to a vertical position as they are grasped by the flanges disposed substantially at right angles to the direction of movement of the machine, cam means secured to the machine adjacent the ground to open the fingers and deposit the plants in the ground, and a second cam means secured to the machine to the rear of the first cam means to pivot said fingers from the plants in a path substantially transversely to the direction of movement of the machine as the fingers move with the conveyor upwardly into the machine to thereby prevent stripping of the plants and engagement with the plants previously deposited.

7. In a transplanter machine, an endless conveyor disposed to move in a path horizontally over the top of the machine thence downwardly to the ground and upwardly back to the top of the machine, means to drive said conveyor at a selected speed, a series of fingers pivoted to the conveyor, a flange projecting from each finger, spring means normally holding said fingers closed, a longitudinally extending cam bar secured to the top of the machine to open said fingers to receive a plant between the flanges and to effect closing of the fingers about said plants by the spring means as the fingers ride off the top of the machine, said fingers lying in a horizontal plane while moving over the top of the machine with the flanges projecting vertically upwardly therefrom and said fingers pivoting to a vertical position when moved toward the ground by the conveyor to move the plants from a horizontal to a vertical position as they are grasped by the flanges disposed substantially at right angles to the direction of movement of the machine, cam means secured to the machine adjacent the ground to open the fingers and deposit the plants in the ground, a second cam means secured to the machine to the rear of the first cam means to pivot said fingers from the plants in a path substantially transversely to the direction of movement of the machine as the fingers move with the conveyor upwardly into the machine to thereby prevent stripping of the plants and engagement with the plants previously deposited, and preselector means connected to the conveyor drive means to drive the conveyor predetermined increments to effect deposit of plants the distance apart selected by the operator in setting the preselector means.

8. In a transplanter machine, an endless conveyor disposed to move in a path horizontally over the top of the machine thence downwardly to the ground and upwardly back to the top of the machine, means to drive said conveyor at a selected speed, a series of fingers pivoted to the conveyor, a flange provided on each finger normal to the finger, spring means normally holding said fingers closed, a longitudinally extending cam bar secured to the top of the machine to open said fingers to receive a plant between the flanges and to effect closing of the fingers about said plants by the spring means as the fingers ride off the top of the machine, said fingers lying in a horizontal plane while moving over the top of the machine with the flanges projecting vertically upwardly therefrom and said fingers pivoting to a vertical position when moved toward the ground by the conveyor to move the plants from a horizontal to a vertical position as they are grasped by the flanges disposed substantially at right angles to the direction of movement of the machine, cam means secured to the machine adjacent the ground to open the fingers and deposit the plants in the ground, a second cam means secured to the machine to the rear of the first cam means to pivot said fingers from the plants in a path substantially transversely to the direction of movement of the machine as the fingers move with the conveyor upwardly into the machine to thereby prevent stripping of the plants and engagement with the plants previously deposited, a coulter secured to the forward end of the machine in line with said conveyor to break up the ground, a plow secured to the machine between the coulter and conveyor and in line with the latter to form a furrow to receive the plants and turbulate the soil, and a pair of packing wheels secured to the machine to the rear of the plow and at the position of deposit of each plant to pack the soil about the roots of each deposited plant.

9. In a transplanter machine, an endless conveyor having pivoted thereto a series of plant planting members, means to drive said conveyor, grasping means on said members, means to open said members for receiving a plant within the grasping means, means to close said grasping means about said plants, said planting members lying in a horizontal plane while moving over the top of the machine with the grasping means projecting therefrom, and said planting members pivoting to a vertical position when moved toward the ground by the conveyor to move said plants from a horizontal to a vertical position as they are grasped by said first named means as the conveyor descends toward the ground, cam means secured to said machine adjacent the ground to open the fingers to deposit the plants in the ground, a second cam means secured to the machine to the rear of the first cam means to pivot said fingers from the plants in a path substantially transversely to the direction of movement of the machine as the fingers move with the conveyor upwardly into the machine to thereby prevent stripping of the plants and engagement with plants previously planted, a preselector mechanism provided as a part of said conveyor drive means, and indexing means in said preselector mechanism adapted to be set by the operator to establish the movement of the preselector mechanism a predetermined distance that will effect movement of the conveyor the distance the operator determines the plants should be spaced apart.

10. In a transplanter machine, an endless conveyor having pivoted thereto a series of plant planting members, means to drive said conveyor, grasping means on said members, means to open said members for receiving a plant within the grasping means, means to close said grasping means about said plants, said planting members lying in a horizontal plane while moving over the top of the machine with the grasping means projecting therefrom, and said planting members pivoting to a vertical position when moved toward the ground by the conveyor to move said plants from a horizontal to a vertical position as they are grasped by said first named means as the conveyor descends toward the ground, cam means secured to said machine adjacent the ground to open the fingers to deposit the plants in the ground, a second cam means secured to the machine to the rear of the first cam means to pivot said fingers from the plants in a path substantially transversely to the direction of movement of the machine as the fingers move with the conveyor upwardly into the machine to thereby prevent stripping of the plants and engagement with plants previously planted, a coulter secured to the forward end of the machine in line with said conveyor to break up the ground, and a plow secured to the machine between the coulter and conveyor, said plow being of generally U-shape with the upper and rearward side surface thereof being generally straight and the forward lower side surface being tapered downwardly to a relatively sharp edge, and the rear edge of said plow extending perpendicularly upwardly for a short distance and then curving rearwardly at the upper portion of the plow.

11. A preselector mechanism for a transplanter machine or the like wherein it is desired to drive a driven means a predetermined increment from a power shaft, which comprises a gear secured to said shaft and meshed with a second gear to drive the latter, a plurality of circumferentially spaced freely movable elements extending transversely of the second gear, a star wheel adapted to be rotated by said elements when engaged by the latter and connected to the driven means, a third gear driven by said star wheel, a fourth gear, a pinion provided between the third and fourth gears to drive the fourth gear, a bevel gear on the face of the fourth gear, an upright selector means meshed with the bevel gear for rotation thereby, a selector head provided on the selector means and adapted to be rotated thereby to engage a respective movable element, and means to locate the selector means at different positions with respect to the star wheel to depress predetermined movable elements for driving engagement with the star wheel to drive from the star wheel th driven means the distance and speed desired.

12. The preselector mechanism of claim 11 wherein the pinion is supported from means permitting removal of the pinion when the selector means is rotated to the position at which the operator desires to locate the same.

13. The preselector mechanism of claim 12 wherein securing means are provided to secure the selector means at a definite location once the operator has moved the selector means to the location desired.

14. The preselector mechanism of claim 12 wherein cam means are provided to move the movable elements to initial position after passing from driving engagement of the star wheel.

15. A transplanter machine comprising a frame, an endless conveyor rotatably mounted on said frame so as to be revolved around said frame from an upper plant loading position to a lower plant depositing position, interspaced fingers on said conveyor, means to open each of said fingers to receive a plant, means to close said fingers about said plant, means adjacent the plant depositing position to open the fingers to deposit the plant in the ground, a shaft extending transversely of the machine and adapted to rotate when the machine is propelled forwardly, a gear secured to said shaft and meshed with a second gear to drive the latter, a plurality of circumferentially spaced freely movable elements extending transversely of the second gear, a star wheel adapted to be rotated by said elements when engaged by the latter and connected to the endless conveyor, a third gear driven by said start wheel, a fourth gear, a pinion provided between the third and fourth gears to drive the fourth gear, a bevel gear on the face of the fourth gear, an upright selector means meshed with the bevel gear for rotation thereby, a selector head provided on the selector means and adapted to be rotated thereby to engage a respective movable element, and means to locate the selector means at different positions with respect to the star wheel to depress predetermined movable elements for driving engagement with the star wheel to drive said endless conveyor from the star wheel and deposit plants the predetermined distance apart.

(References on following page)

References Cited in the file of this patent

UNITED STATES PATENTS

| | | |
|---|---|---|
| 1,059,316 | Reavis | Apr. 15, 1913 |
| 1,284,125 | Ter Meer | Nov. 5, 1918 |
| 1,542,400 | Ter Meer | June 16, 1925 |
| 1,957,394 | Heinitz | May 1, 1934 |
| 1,963,591 | Pomieraniec | June 19, 1934 |
| 1,996,686 | Poll | Apr. 2, 1935 |
| 2,020,877 | Coolidge | Nov. 12, 1935 |
| 2,191,541 | Poole | Feb. 27, 1940 |
| 2,335,132 | Pomieraniec | Nov. 23, 1943 |
| 2,482,434 | Poole | Sept. 20, 1949 |
| 2,651,405 | McGowan | Sept. 8, 1953 |